May 20, 1941.  S. F. THUNBERG  2,242,333
RADIO INTERFERENCE ELIMINATOR
Filed Oct. 3, 1939

INVENTOR.
Sigurd Ferdinand Thunberg
BY Thomas C. Betts
his ATTORNEY.

Patented May 20, 1941

2,242,333

UNITED STATES PATENT OFFICE 2,242,333

RADIO INTERFERENCE ELIMINATOR

Sigurd Ferdinand Thunberg, Ronninge, Sweden, assignor to Electrolux Corporation, Dover, Del., a corporation of Delaware Application October 3, 1939, Serial No. 297,641
In Germany October 3, 1938

8 Claims. (Cl. 172—36)

My invention relates to means for eliminating radio interference caused by an electric motor. More especially, my invention relates to such means incorporated in an electrically operated vacuum cleaner.

In accordance with my invention the electric motor is surrounded by at least two metallic shields which are electrically insulated from each other. A pair of condenser circuits are bridged across the armature of the motor, either at the brushes, or at the motor terminals. The midpoint of one circuit is electrically connected by means of a direct metallic connection to one of the shields, while the midpoint of the other circuit is electrically connected in similar manner to the other shield. The inner of the two shields is preferably the metal housing of the motor itself, while the outer shield is a metal case surrounding the motor housing. In addition, there is preferably provided a casing around the aforesaid case and electrically insulated therefrom and from the motor, its purpose being to prevent the operator from accidentally contacting any of the charged parts. This casing may be the outer casing of the vacuum cleaner itself.

Further objects and advantages of my invention will be apparent from the following description considered in connection with the accompanying drawing, which forms a part of this specification, and of which:

Figure 1:
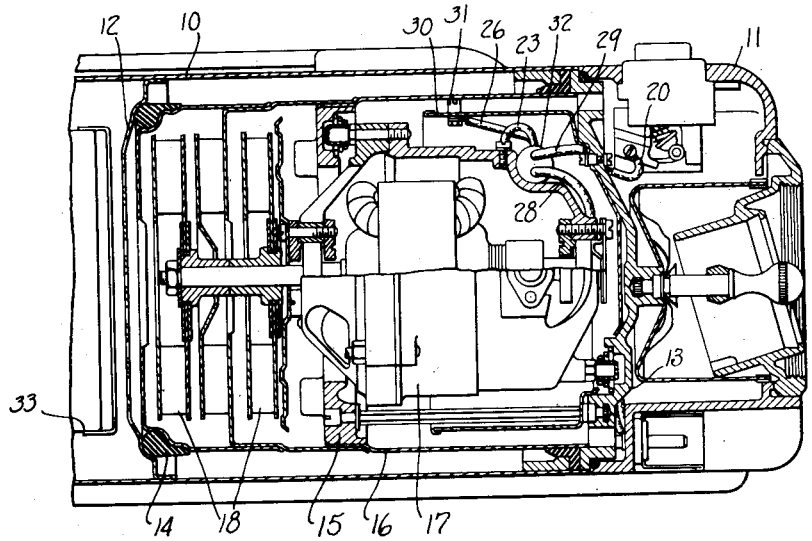
Fig. 1 is a cross-sectional view of a portion of a vacuum cleaner embodying my invention.

Referring more particularly to Fig. 1, reference character 10 indicates the exterior casing of a vacuum cleaner, which may be of any suitable material. One end of the casing 10 is closed by means of an end member 11, removably securable thereto in any suitable manner.

Disposed in spaced relation within the casing 10 are transverse partitions 12 and 13. Partition 13 is preferably made of electrical insulating material, while partition 12 may be of sheet metal provided with perforations. Supported between the partitions 12 and 13 is a metal case 16 which is insulated from the partition 12 by means of a ring 14 of insulating material. A ring 15 of insulating material is disposed within case 16 and serves to support one end of an electric motor 17. The other end of the motor is supported from partition 13.

Mounted on one end of the armature shaft of the motor are fan rotors 18, the adjacent portion of case 16 serving as a fan housing.

Figure 2:
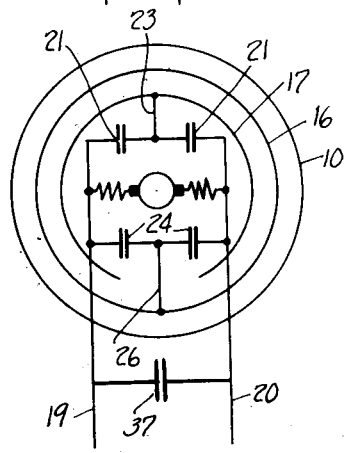
Fig. 2 is a wiring diagram in accordance with one embodiment of my invention.
Figure 3:
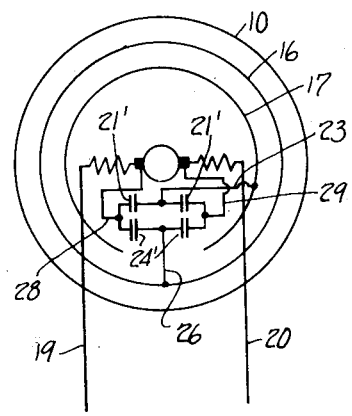
Fig. 3 is a wiring diagram in accordance with another embodiment.

A condenser unit 32 is mounted adjacent to the end of the motor, and as shown in Fig. 1, is conveniently secured to the motor housing 17. Figs. 2 and 3 show two different ways in which the condensers of unit 32 may be connected in accordance with the present invention.

According to Fig. 2, a condenser means comprising a pair of condensers 21 is bridged across the terminals of the field coils, that is, across the motor leads 19 and 20 and the midpoint of the condensers is connected metallically by means of a conductor 23 with the motor housing 17, which constitutes the inner of two shields. Another condenser means comprising a pair of condensers 24 is likewise bridged across the terminals of the field coils and the midpoint is connected metallically by means of a conductor 26 with the case 16. The condensers 21 and 24 serve first of all to suppress the asymmetrical interference voltage. If the capacity of these condensers is not sufficient to also suppress the symmetrical interference voltage, an additional condenser 37 may be bridged across the motor leads 19 and 20.

The embodiment shown in Fig. 3 is similar to that illustrated in Fig. 2, with the exception that the circuits including the condensers 21' and 24' are bridged across the brushes of the motor instead of across the terminals of the field coils. As described in connection with Fig. 2, the midpoint of each circuit is electrically connected to the motor housing 17 and the case 16, respectively. Due to the fact that the case 16 is electrically insulated from all of the surrounding parts of the cleaner by means of the insulating ring 14 and the partition 13 of insulating material, it is impossible for the operator to receive a shock even should the end cap 11 be removed or should he reach into the casing 10 from the opposite end when the dust bag 33 has been removed.

As shown in Fig. 1, a cylindrical member 30 is carried by the partition 13, the purpose of which is to cause the air discharged by the fan through and around the motor housing to flow in a reversed direction in order to eliminate noise. This member 30 is connected by means of an electric conductor 31 with the case 16 and hence may be considered electrically as part of this case.

While I have shown and described two more or less specific embodiments of my invention, it is to be understood that this has been done for purposes of illustration only and that its scope is not to be limited thereby but is to be determined by the appended claims.

What I claim is:

1. In a device of the class described, an electric motor having an armature, a metal housing around said armature, a metal case around and electrically insulated from said housing, a first condenser means bridged across said armature and having a midpoint electrically connected to said housing by a direct metallic connection, and a second condenser means bridged across said armature and having a midpoint electrically connected to said case by a direct metallic connection.

2. In a device of the class described, an electric motor having an armature and brushes, a metal housing around said armature, a metal case around and electrically insulated from said housing, a first condenser means bridged across said brushes and having a midpoint electrically connected to said housing by a direct metallic connection, and a second condenser means bridged across said brushes and having a midpoint electrically connected to said case by a direct metallic connection.

3. In a device of the class described, an electric motor having a field, a metal housing around said field, a metal case around and electrically insulated from said housing, a first condenser means bridged across the terminals of said field and having a midpoint electrically connected to said housing by a direct metallic connection, and a second condenser means bridged across said terminals and having a midpoint electrically connected to said case by a direct metallic connection.

4. Apparatus as claimed in claim 1 in which said metal housing constitutes the housing of the electric motor.

5. Apparatus as claimed in claim 1 including an ungrounded condenser bridged across the leads of said electric motor.

6. Apparatus as claimed in claim 2 including an ungrounded condenser bridged across the leads of said electric motor.

7. Apparatus as claimed in claim 3 including an ungrounded condenser bridged across the leads of said electric motor.

8. In a vacuum cleaner, an outer casing, a metal case supported within and electrically insulated from said casing, an electric motor having an armature and a metal housing disposed within and electrically insulated from both said case and said casing, a first condenser means bridged across said armature and having a midpoint electrically connected to said housing by a direct metallic connection, and a second condenser means bridged across said armature and having a midpoint electrically connected to said case by a direct metallic connection.

SIGURD F. THUNBERG.